UNITED STATES PATENT OFFICE 2,626,881

SOLDER FLUX AND METHOD OF PREPARING THE FLUX

William H. Schoenfeld, Jr., Glen Ellyn, Ill., assignor to American Can Company, New York, N. Y., a corporation of New Jersey No Drawing. Application August 1, 1950, Serial No. 177,140

12 Claims. (Cl. 148—23)

This invention relates to a solder fluxing composition and to a method of preparing the flux and has particular reference to an improved fluxing composition comprising a mixture of hydrogenated wood rosin and hydrochloric acid dissolved in a suitable volatile solvent and to a method of compounding the flux.

An object of the invention is the provision of a novel acid fluxing composition that is non-toxic and non-corrosive, which flux comprises a solution of an hydrogenated wood rosin and hydrochloric acid in a suitable solvent.

Another object is the method of making an acid solder flux which is made in a simple and economic manner and which flux leaves no corrosive residues on the metal after soldering is completed.

Another object is the provision of a flux which leaves as its only residue an innocuous, non-toxic, taste free, non-hydroscopic resin coating, so as to minimize the dangers of rusting of the soldered area of a metal.

Another object is the provision of an hydrogenated wood rosin and hydrochloric acid flux that is stable in solution over long periods of time.

Another object is the provision of an hydrogenated wood rosin and hydrochloric acid dissolved in an alcohol solvent as a fluxing material which contains no hydroscopic or corrosive ingredients.

Another object is the provision of a flux comprising an hydrogenated wood rosin and hydrochloric acid in which the acid is volatile and of proper strength and gaseous activity to keep soldering irons properly cleaned and wet with solder at all times during the soldering operations.

Numerous other objects and advantages of the invention will be apparent as it is better understood from the following description, which discloses a preferred embodiment thereof.

Rosin fluxes for soldering have been known for a long time. Acid fluxes, such as zinc chloride, hydrochloric acid and mixtures of the latter two have also had long usage in the art. Rosin solutions are not suitable as fluxing agents for certain high speed operations in modern can making. They are of very little or practically no value, for instance, when the side seam of the container is soldered from the inside, instead of the outside, portion of the seam.

In the can making art, the side seam of metal containers may be soldered from the inside or outside. Cans which have soldered side seams and are lithographed around their entire circumference are almost invariably soldered from the inside. They are, however, not the only containers so manufactured. Plain, uncoated cans are also frequently made in this manner. Machines for inside soldering are disclosed in the W. M. Holloway Patents 1,799,465 and 1,947,471 granted April 7, 1931 and February 20, 1934, respectively.

Those familiar with the can making art are aware that a rosin solution is not adaptable as a solder flux for inside soldered cans because some rosin is deposited on the soldering irons where it chars and so fouls the irons that in a very short time they fail to pick up solder from the solder bath.

Zinc chloride has the quality of being an excellent fluxing agent, and of maintaining the soldering irons on inside soldering units wet with solder, but it has several serious drawbacks.

Zinc chloride is very hygroscopic and in a moist state is very corrosive. It is non-volatile, so that it adheres as a residue to the soldering irons, to the soldered seams of containers and to the can manufacturing equipment which it contacts. Thus, constant care of equipment is required when zinc chloride is employed as a flux. Zinc chloride is also undesirable in containers which are to be packed with food products because the food contacting the side seam of an inside soldered can becomes contaminated with the zinc salt, and to prevent such a condition the side seams must be washed to remove the flux residue.

I discovered that the difficulties inherent in both rosin and zinc chloride fluxes can be overcome by the use of a mixture of an hydrogenated wood rosin and hydrochloric acid in solution in a suitable solvent.

Staybelite resins are hydrogenated rosins and esters of hydrogenated rosins. A Staybelite resin that is particularly advantageous in my fluxes is sold by the Hercules Powder Company under the name of Staybelite 742, which comprises a hydrogenated wood rosin.

The hydrochloric acid may be in the form of a concentrated solution containing 37% by weight of hydrogen chloride in water or it may be in the form of hydrogen chloride gas dissolved in the flux solvent. For reasons of simplicity of handling and blending, the hydrochloric acid is preferred.

Volatile alcohols are excellent solvents for the flux. They are compatible with the hydrogenated wood rosin, aqueous hydrochloric acid and hydrogen chloride gas. Among the alcohols that are suitable are ethyl alcohol, the propyl group, the butyl group and the amyl group. Of these the propyl alcohols are preferred.

In preparing the flux particular attention must be paid to the order in which the ingredients are added and mixed. I found that a stable solution can be made by preparing a solution of alcohol containing from 0.5 to 6% by volume of concentrated hydrochloric acid, and adding to the acid-alcohol mixture approximately an equal volume of an alcohol solution of hydrogenated wood rosin containing from 1 to 4 lbs. of rosin per gallon of alcohol or approximately 13.0 to about 34.3% of the rosin. This results in a concentration of about 7.0 to about 23.1% by weight of rosin and from about 0.25 to about 3.0% by volume of hydrochloric acid in the final flux solution. If concentrated hydrochloric acid is added directly to the rosin solution, some of the rosin precipitates immediately and does not go back into solution.

The rosin must be an hydrogenated wood rosin, preferably Staybelite 742, in order to form a stable solution. Attempts to substitute ordinary, unhydrogenated rosin failed in each instance, regardless of the method of preparation, because the rosin precipitated from the acid solutions.

Successful fluxes according to my invention have been made utilizing from ½ lb. to 2 lbs. of hydrogenated wood rosin per gallon of flux which contained from 0.25% to 3% by volume of concentrated hydrochloric acid, or approximately 3.5 g. to 50.2 g. of hydrogen chloride. The concentration of hydrogenated wood rosin ranges from about 7.0% to about 23.1% by weight of alcohol hydrogenated wood rosin mixture, calculated on the basis of a specific gravity of 0.8 for the alcohol.

Hydrogen chloride gas dissolved in the flux solvent is as effective as concentrated hydrochloric acid when used in equivalent quantities.

My preferred flux contains about 13% by weight of hydrogenated wood rosin in isopropyl alcohol and about 0.5% by volume of concentrated (37%) hydrochloric acid.

In soldering metal containers with my novel flux, the liquid flux is applied to the marginal edges of the interfolded metal layers comprising the side seam and molten solder is then applied to the fluxed side seam. The heat of the solder (450° F. or above) is sufficient to volatilize the alcohol solvent and the hydrochloric acid. On the inside solder horse, the soldering irons are completely enveloped by the hydrochloric acid and alcohol vapors. The volatilized hydrochloric acid has sufficient strength and activity to keep the soldering irons clean and free of any charred deposits. As each can is soldered it releases a fresh volume of hydrochloric acid vapors which insures cleanliness of the soldering irons over long, continued and uninterrupted periods of operation. The hydrochloric acid vapors are withdrawn from the proximity of the soldering irons about as soon as they have produced their beneficial effects thereon, so that there is no corrosive residue remaining on the irons or the remainder of the equipment. The residue remaining on the side seam of the container is an innocuous, non-hygroscopic, non-corrosive, tasteless hydrogenated wood rosin. The resin not only fails to promote corrosion, it actually forms a protective layer at the side seam which tends to act as a corrosion preventive medium.

Although the inside soldering of metal cans has been stressed herein, the flux is equally effective for outside soldering of metal cans and other solderable materials, especially those which have a steel or tinplate base.

It is thought that the invention and many of its attendant advantages will be understood from the foregoing description and it will be apparent that various changes or modifications may be made in the compositions and method steps described without departing from the spirit and scope of the invention or sacrificing all of its material advantages, the compositions and method steps hereinbefore described being merely a preferred embodiment thereof.

I claim:

1. A soldering flux comprising a hydrogenated wood rosin and concentrated hydrochloric acid in solution in a compatible volatile alcohol, said acid being at least about 0.25% by volume and said rosin being at least about 7% by weight of the mixture.

2. A soldering flux comprising from about 7% to about 23.1% by weight of hydrogenated wood rosin and from about 3.5 to about 50.2 grams of hydrogen chloride gas per gallon of flux, said rosin and said hydrogen chloride gas being dissolved in a compatible volatile alcohol.

3. A soldering flux comprising from about 7% to about 23.1% by weight of hydrogenated wood rosin and from about .25% to about 3% by volume of concentrated hydrochloric acid dissolved in a compatible volatile alcohol.

4. A solder flux, comprising from about 7% to about 23.1% by weight of hydrogenated wood rosin and from 0.25% to 3.0% by volume of concentrated hydrochloric acid in solution in isopropyl alcohol.

5. A soldering flux comprising about 13% by weight of hydrogenated wood rosin and about 0.5% by volume of concentrated hydrochloric acid in solution in isopropyl alcohol.

6. The method of preparing a solder flux which comprises preparing a solution of hydrogenated wood rosin in a volatile alcohol, preparing a second solution of concentrated hydrochloric acid in a volatile alcohol compatible with the rosin and acid, and adding the rosin solution to the hydrochloric acid solution, said acid being present in a concentration of at least about 0.25% by volume and said rosin being present in a concentration of at least about 7% by weight of the mixture.

7. The method of preparing a solder flux comprising, dissolving from one to four pounds of hydrogenated wood rosin in a gallon of volatile alcohol, preparing a second solution of concentrated hydrochloric acid in a volatile alcohol compatible with the rosin and the acid and adding the rosin solution to the acid solution in such proportions that the final concentration of the acid in solution in the flux is from about 0.25% to about 3% by volume, and the concentration of rosin is from about 7.0% to about 23.1% by weight of the mixture.

8. The method of preparing a solder flux comprising, dissolving from one to four pounds of hydrogenated wood rosin in a gallon of a volatile alcohol, preparing a second solution of hydrogen chloride in a volatile alcohol that is compatible with the rosin and the hydrogen chloride, and adding the rosin solution to the hydrogen chloride solution in such proportions that the rosin in solution in the flux is from about 7.0% to about 23.1% by weight of the finished flux and the hydrogen chloride content ranges from about 3.5 grams to about 50.2 grams per gallon of finished flux.

9. The method of preparing a solder flux comprising dissolving from 1 to 4 pounds of hydrogenated wood rosin in a gallon of a volatile alcohol, preparing a solution of from about 0.5% to about 6.0% by volume of concentrated hydrochloric acid in a volatile alcohol and adding a quantity of the rosin solution to substantially an equal quantity of the acid solution.

10. The method of preparing a solder flux comprising dissolving from 1 to 4 pounds of hydrogenated wood rosin in a gallon of isopropyl alcohol, preparing a solution of from about 0.5% to about 6.0% by volume of concentrated hydrochloric acid in isopropyl alcohol and adding a quantity of the rosin solution to substantially an equal quantity of the acid solution.

11. The method of preparing a solder flux comprising making an isopropyl alcohol solution of hydrogenated wood rosin containing about 26% by weight of said rosin, preparing an isopropyl alcohol solution of concentrated hydrochloric acid so that the acid content is about 1.0% by volume and adding a quantity of the said rosin solution to substantially an equal quantity of the acid solution.

12. A soldering flux comprising a hydrogenated wood rosin and a hydrogen halide ingredient selected from the class consisting of concentrated hydrochloric acid and hydrogen chloride gas, said rosin and said hydrogen halide being dissolved in a compatible volatile alcohol, said rosin being present in a concentration of from about 7% to 23.1% by weight of the flux and said hydrogen halide being present in a quantity equivalent to from about 3.5 to 50.2 grams of hydrogen chloride gas per gallon of flux.

WILLIAM H. SCHOENFELD, Jr.

REFERENCES CITED

The following references are of record in the file of this patent:

UNITED STATES PATENTS

| Number | Name | Date |
|---|---|---|
| 1,709,542 | Raymond | Apr. 16, 1929 |
| 1,882,567 | Saukaitis | Oct. 11, 1932 |
| 1,949,916 | McQuaid | Mar. 6, 1934 |
| 2,095,335 | Kofke | Oct. 12, 1937 |
| 2,311,609 | Kauppi et al. | Feb. 16, 1943 |
| 2,480,723 | Evans et al. | Aug. 30, 1949 |